United States Patent [19]

Ranger

[11] Patent Number: 4,757,247

[45] Date of Patent: Jul. 12, 1988

[54] SINGLE STEP STEPPING MOTOR CONTROLLER

[75] Inventor: Michael H. Ranger, San Jose, Calif.

[73] Assignee: NCR Corporation, Dayton, Ohio

[21] Appl. No.: 41,167

[22] Filed: Apr. 22, 1987

[51] Int. Cl.4 ............................................. H01P 8/00
[52] U.S. Cl. .................................... 318/696; 318/685;
318/138
[58] Field of Search ........................ 318/696, 685, 138

[56] References Cited

U.S. PATENT DOCUMENTS 3,560,821  2/1971  Beling ................................. 318/138

Primary Examiner—William M. Shoop, Jr.
Assistant Examiner—Saul M. Bergmann
Attorney, Agent, or Firm—Wilbert Hawk, Jr.; Edward Dugas

[57] ABSTRACT

A nonoscillatory single step operation of a stepping motor is obtained by using normal driving circuitry and voltage to start the stepping operation in the desired stepping direction and by simultaneously starting a timer which is adjusted in duration to correspond to the time it takes for the rotor to almost reach the null position. At that time an increased voltage, of the same polarity as the normal stepping voltage, is applied, so as to strongly lock the rotor to the null position with minimum oscillation.

10 Claims, 5 Drawing Sheets

| DIRECTION | STATE | T3 | T4 | T2 | T1 | T5 | T6 | DIRECTION |
|---|---|---|---|---|---|---|---|---|
| C L O C K W I S E  S T E P S ↓ | 1 | ON | OFF | ON | ON | ON | OFF | C O U N T E R  C L O C K W I S E  S T E P S ↑ |
| | 2 | OFF | ON | OFF | ON | ON | OFF | |
| | 3 | OFF | ON | ON | OFF | OFF | ON | |
| | 4 | ON | OFF | OFF | ON | OFF | ON | |
| | 5 | ON | OFF | ON | OFF | ON | OFF | |
| | 6 | OFF | ON | OFF | ON | ON | OFF | |
| | 7 | OFF | ON | ON | OFF | OFF | ON | |

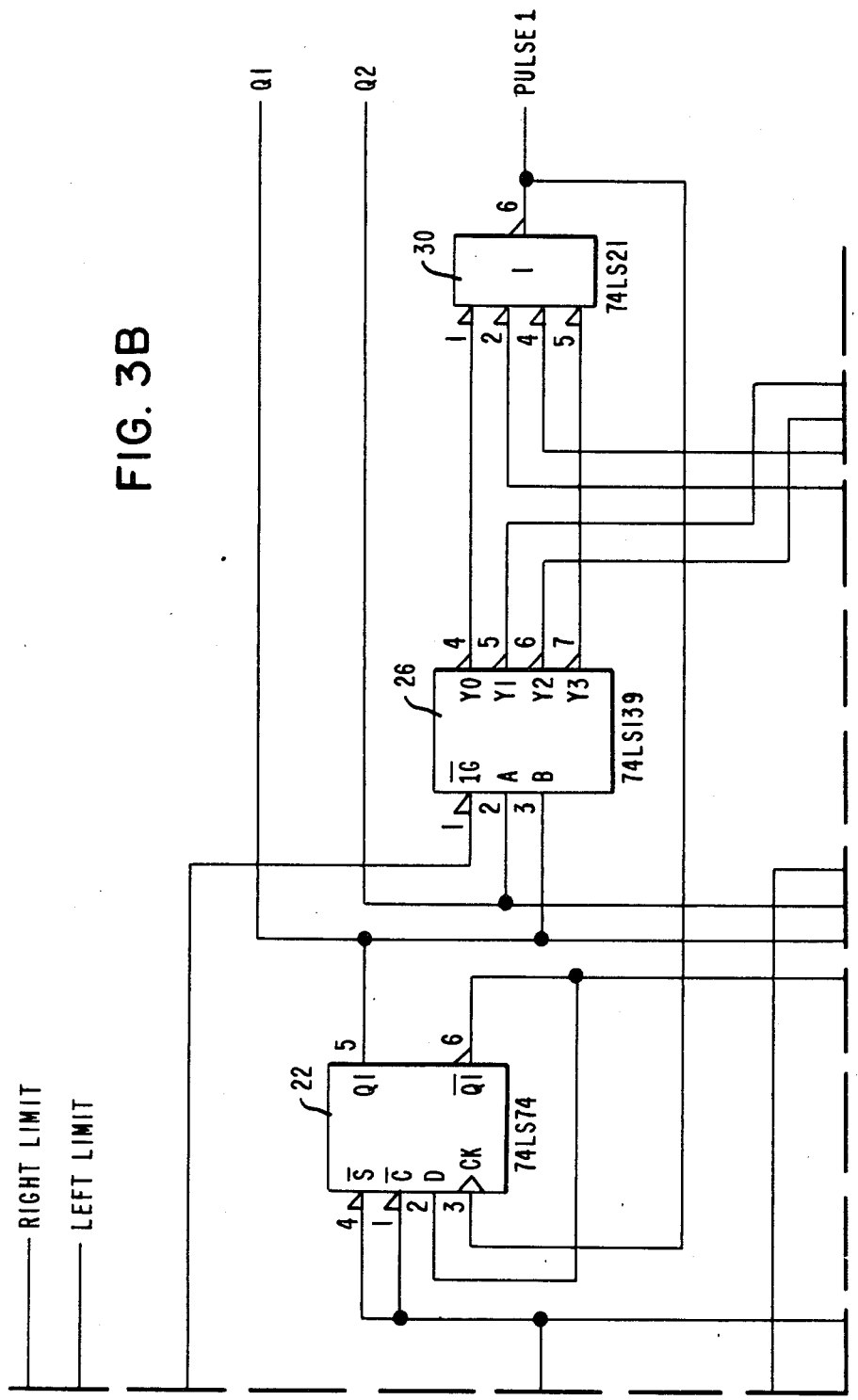

SINGLE STEP STEPPING MOTOR CONTROLLER

BACKGROUND OF THE INVENTION

This invention relates generally to stepping motor control systems and in particular to a control system for obtaining non-oscillatory single step operation of a stepping motor.

Stepping motors are generally used to move some form of apparatus from one position to another position with a high degree of accuracy. Stepping motors are designed with a number of null positions, e.g., 200 null positions for a single rotation of the motor's rotor. In a preferred mode of operation, when the rotor is to be advanced to the next null position, the advancement should take place quickly and without an undershoot and/or overshoot so as to facilitate the positioning of the driven apparatus in the quickest possible manner. Generally speaking, the rotor tends to overshoot the null position and to then reverse direction back towards the desired null position and to continue this oscillatory behavior for a period of time, which in turn decreases the accuracy of the positioning of the rotor to the null position while increasing the settling time of the rotor in its new null position.

The aforementioned problem has been recognized and attacked by prior art controllers. A representation of the state of the prior art, directed towards a solution of the above problem, is set forth in the teachings of the following listed patents:

U.S. Pat. No. 4,490,665 entitled, "Method For Driving A Stepper Motor" by R. C. Meyer;
U.S. Pat. No. 4,564,796 entitled, "Driving Circuit For A Stepping Motor" by T. Yoshimo et al.; and
U.S. Pat. No. 3,573,592 entitled, "Single Step Stepping Motor Control" by G. J. Agin.

In U.S. Pat. No. 4,490,665, the stepper motor is accelerated quickly by applying a high level drive voltage during the initial stepping phase of motor operation and therafter reducing the high voltage to a normal standby or low voltage. In U.S. Pat. No. 4,564,796, a driving circuit drives the stepping motor in a two-phase operation and switches to a single-phase operation immediately before stopping the motor, thereby achieving a degree of stability in the stopped position. In U.S. Pat. No. 3,573,592, the stepping motor is driven in the usual manner with drive triggers to start the step operation and upon nearing the null position gating circuitry is used to obtain a one step-backward function for terminating the single step operation.

SUMMARY OF THE INVENTION

Generally stated, it is an object of the present invention to provide an improved single step control system for a stepping motor.

It is another object of the present invention to provide a controller which initiates rotor movement to a null position using a drive voltage and prior to the rotor reaching the null position, automatically applies a current source from a voltage substantially greater than the driving voltage to cause the rotor to lock to the null position with minimum overshoot.

It is an object of this invention to provide a single step controller for a stepping motor which assures a high degree of accuracy in rotor positioning at each step of the motor.

In the present invention, the control system is comprised of a stepping motor having a first and a second pair of windings and a means for selectively applying a first voltage level to a selected winding of the first and second pair of windings to cause the motor to step towards a null position. Additionally provided is a means for applying a current source from a second voltage of higher level than the first voltage to the selected windings prior to the motor reaching the null position.

The above and other objects of the present invention will become more apparent when taken in conjunction with the following description and drawings wherein like characters indicate like parts and which drawings form a part of the present disclosure.

BRIEF DESCRIPTION OF THE DRAWINGS

FIGS. 3, 3A, 3B and 3C, assembled in accordance with the map of FIG. 3, illustrate in block schematic form a first portion of the preferred embodiment of the invention.

DESCRIPTION OF THE PREFERRED EMBODIMENT

Figures 1, 2:
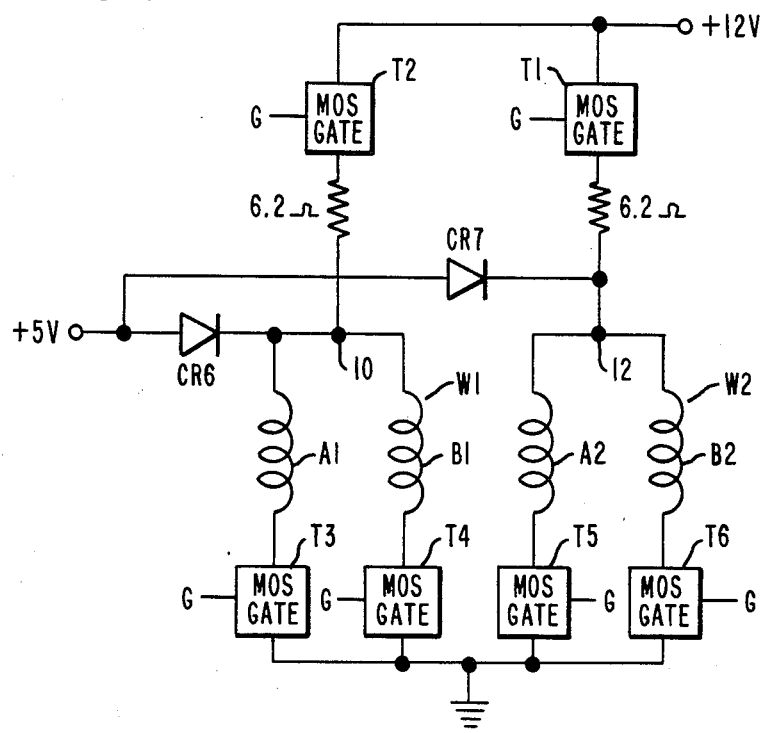
FIG. 1 is a simplified schematic diagram of the preferred embodiment of the invention.
FIG. 2 is a table, to be used in conjunction with the description of the embodiment of FIG. 1, for enabling an understanding of the operation of the preferred embodiment.

Referring now to the simplified schematic diagram of FIG. 1, the stepper motor used in the preferred embodiment is comprised of two pairs of motor windings, W1 and W2, each having a center tap, 10 and 12, respectively, connected to windings A1, B1 and A2, B2, respectively. The center tap 10 is connected to a +5 V source by means of a diode CR6. A diode CR7 connects the center tap 12 to the +5 V source. A +12 V source is connectable by MOS gates T2 and T1, when enabled, and 6.2 ohm resistors to the center taps 10 and 12, respectively. When T2 is not enabled, the +12 V source is isolated from the center tap 10, and when T1 is not enabled the +12 V source is isolated from the center tap 12. In the quiescent state a pair of MOS gates, T3 and T4, when enabled, connect the windings A1 and B1 in circuit to ground so as to cause current to flow from the +12 V source, through the associated resistor and motor winding, to ground. In a like manner, the second pair of motor windings, A2 and B2 are connected in circuit to ground by means of MOS gates T5 and T6, respectively, when they are enabled. Each of the MOS gates has an enabling gate labeled G for receiving signals for turning the respective MOS gate ON or OFF.

Referring now to the table of FIG. 2, in conjunction with the simplified circuitry of FIG. 1, with the motor's rotor at rest in the State 1 position, gates T1, T2, T3 and T5 are ON (enabled) and gates T4 and T6 are OFF. In order for the motor's rotor to advance to State 2, in a clockwise direction, it is necessary to cause gate T3 to go OFF and for gate T4 to come ON. The gates T5 and T6 remain in the same state as existed for State 1 without change. Also gate T1 remains unchanged in its ON condition. At the time of transition of gate T3 from the ON to the OFF state and T4 from the OFF to the ON state, gate T2 is turned OFF and remains OFF for a predetermined interval of time, Δt, which interval is sufficient to permit the rotor to approach the null position corresponding to State 2.

As the current in B1 rises (in an approximately linear manner) and the current in A1 falls, the effective magnetic null position of the rotor slews smoothly between the position corresponding to State 1 and State 2. The rotor attempting to follow the effective magnetic null position, first lags the slewing null, for the first half of the interval then leads and decelerates to approach the final null position (State 2) just at the end of the time interval Δt. During this interval windings A1 and B1 are supplied from the +5 source by the diode CR6. Upon approaching the desired null position, gate T2 is turned ON to effectively apply the current source from the +12 V through the winding B1 serviced by gate T4 and the 6.2 ohm resistor. This current feed, applied as the rotor moves towards the null position, causes the rotor to strongly lock to the null position without oscillatory overshooting. In order to increment the stepper motor from State 2 to State 3 in a clockwise direction, from the table we see that the gates T3 and T4 remain in the state determined by State 2, gate T2 remains ON and gate T5 is to be turned OFF with gate T6 being turned ON. Upon that occurrence, gate T1 is turned OFF for a period, as previously described, of predetermined length. If the motor's rotor is to be rotated in a counterclockwise direction, the sequence of states shown for the various gates is approached from the initial (present) state, and the next state to be achieved is the one above the initial state rather than the one below.

The motor of the preferred embodiment is a 200 step motor of the type manufactured by Superior Electric Co., Bristol, CN, having their part number M061-FC02. In the table of FIG. 2, only the steps corresponding to Steps 1–7 are shown for simplification purposes, it being understood that the remaining Steps 8–200 repeat in a like pattern.

Figures 3, 3A:
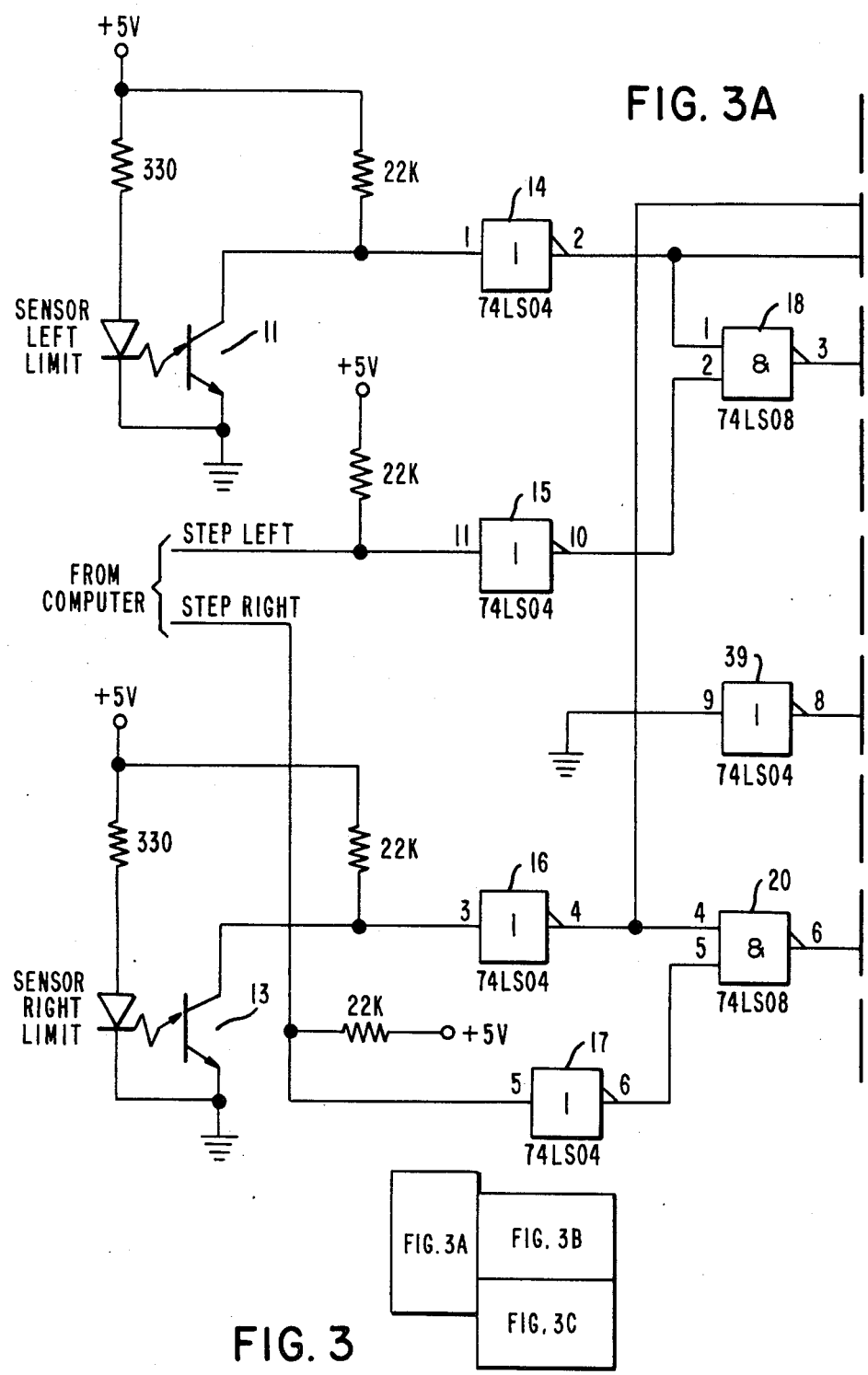
Figure 3C:
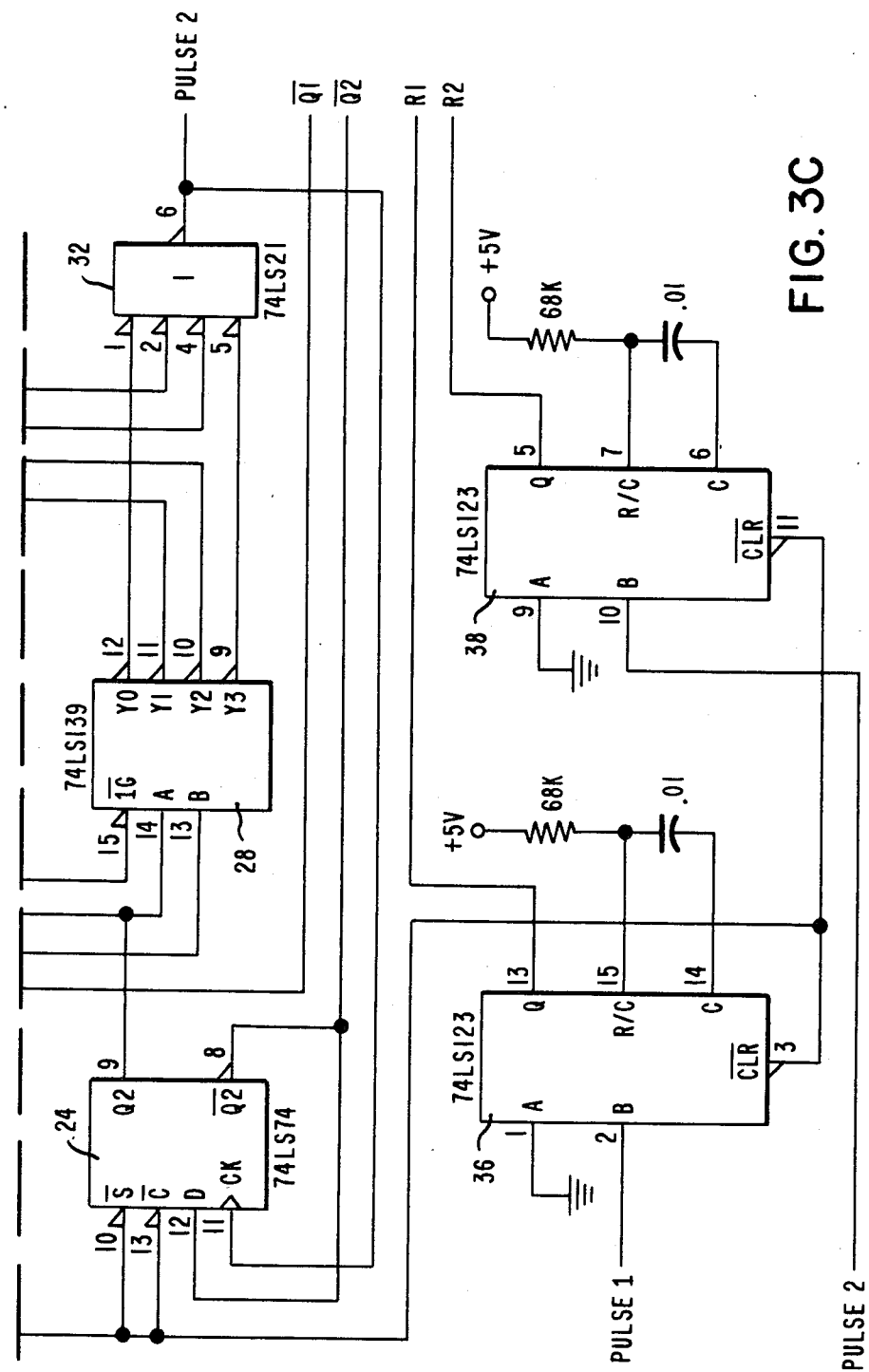

Referring now to FIGS. 3A, 3B and 3C, assembled in accordance with the map of FIG. 3, the controller circuitry is provided with a right and a left limit detecting apparatus so that the mechanism in which the stepper motor functions is limited in its movement between two acceptable ranges. Other types of circuitry and/or mechanical limiting may be used as desired, the main purpose of disclosing such circuitry in the present invention is to provide the environment for which the present invention has particular applicability. The left and the right limit circuitry are identical in construction and are comprised of an LED and a photosensitive transistor pair, generally indicated as items 11 and 13, coupled to inverters 14 and 16, respectively. The light beam from the LED causes the phototransistor to conduct and to effectively ground the input to the respective inverter. When the right or left limit is reached, the light beam from the particular LED experiencing the limit is interrupted by a physical masking, such as an arm projecting from a carriage, thereby causing the respective phototransistor to turn OFF, which in turn causes the voltage on the input to the respective inverter to rise from ground. The output of the inverters 14 and 16 are directed to other circuitry (not shown) and to an input to AND gates 18 and 20, respectively, for indicating that one or the other of the limits has been reached. In the preferred embodiment of the invention, the left limit and right limit signals act to cut-off the enablement of AND gates 18 and 20, respectively. The AND gate 18 is adapted to also receive stepping pulses from a computer (not shown) via an inverter 15, when the stepping motor's rotor is to be stepped in the left direction. In a like manner, AND gate 20 receives step right pulses from a computer, via an inverter 17, when the stepping motor's rotor is to be stepped in the right direction. It is to be understood that clockwise and counterclockwise rotation of the motor's rotor is translated into left and right movement of the apparatus driven by the motor. Each pulse received, either on the step left or the step right input, corresponds to one step of the stepping motor in the indicated direction. The output signals from AND gates 18 and 20 are directed as an input to a dual 2-to-4 line decoder, 26 and 28, respectively, of the type manufactured by National Semiconductor and bearing their part No 74LS139. The input signals from the AND gates 18 and 20 constitute enabling signals and are received on the enabling inputs labeled 1G/. When an enabling signal is present on the enabling input of either decoder 26 or decoder 28, the state of the signals received on the respective inputs, labeled A and B, will cause coded output bits to appear on the output terminals labeled $Y_0$ through $Y_3$. In the absence of an enabling signal, all of the outputs, $Y_0$ through $Y_3$, will be at a high logic level. The outputs, $Y_1$ and $Y_2$, from the decoders 26 and 28 are cross-coupled to a pair of four input AND gates 30 and 32, respectively. The remaining two inputs to the AND gates 30 and 32 are received from the associated output terminals $Y_0$ and $Y_3$ from each of the decoders 26 and 28, respectively. The output of AND gate 30 is designated a PULSE 1 signal with the output of AND gate 32 being designated a PULSE 2 signal. A PULSE 1 signal will be present on the output of the AND gate 30 when all of the inputs, labeled 1 through 5, are at the high logic level. In a like manner, a PULSE 2 signal will be present at the output of the AND gate 32 if all of its inputs, labeled 1 through 5, are at a high logic level. The output line from AND gate 30 is directed to the clocking input, CK, of a D-type flip-flop 22. The output line from the AND gate 32 is directed to the clocking input, CK, of a D-type flip-flop 24. A D-type flip-flop places the data present on its D input to the complementary outputs Q and Q/ during the positive-going transition of the signal present on its CK input. The S/ and C/ inputs correspond to set and clear inputs of the flip-flops, which inputs are connected to a high logic level by an inverter 39 which has its input connected to ground. The Q/ output of flip-flop 22 is denoted as Q1/ and is fed-back to the D input of flip-flop 22 and to an output line labeled Q1/. The Q output is denoted as Q1 and is directed to the inputs labeled B of the line decoders 26 and 28 and to a like labeled output line. The output Q2, of the D-type flip-flop 24, is directed to the inputs labeled A of the line decoders 26 and 28 and to a like labeled output line. The Q2/ output of the D-type flip-flop 24 is connected to its D input and to an output line labeled Q2/.

In operation, upon a receipt of a left and/or a right negative pulse on the inputs of the inverters 15 and/or 16 respectively, the circuit thus far described will generate the signals Q1, Q1/ and Q2, Q2/ in the order and logic state which will cause the OFF and ON conditions of the gates T3, T4 and T5, T6 in accordance with the table of FIG. 2. The PULSE 1 signal is generated each time the signals Q1 and Q1/ toggle or change their complementary states. In a like manner, the PULSE 2 signal is generated each time the signals Q2 and Q2/ change state. The PULSE 1 signal is directed to a B labeled input of a timing circuit 36, which in the preferred embodiment of the invention is a one-shot multivibrator of the type manufactured by National Semiconductor under their part No. 74LS123. Upon receipt of the PULSE 1 signal and the lapse of a predetermined timed interval, a signal R1 appearing on the like labeled output line connected to the Q labeled output of timer 36 will change state. The time duration of the timer 36 is selected by the size of a capacitor connected between the terminals numbered 14 and 15 and the size of the resistor connected to the +5 V source. In the preferred embodiment of the invention the capacitor was sized at 0.1 microfarids and the resistor was sized at 68K ohm, so as to provide a timing interval equal to 2.5 milliseconds. In a like manner, the timing circuit 38 receives the pulse signal PULSE 2 and provides a change in state of the output signal, R2, 2.5 milliseconds after receipt of the PULSE 2 signal.

Figure 4:
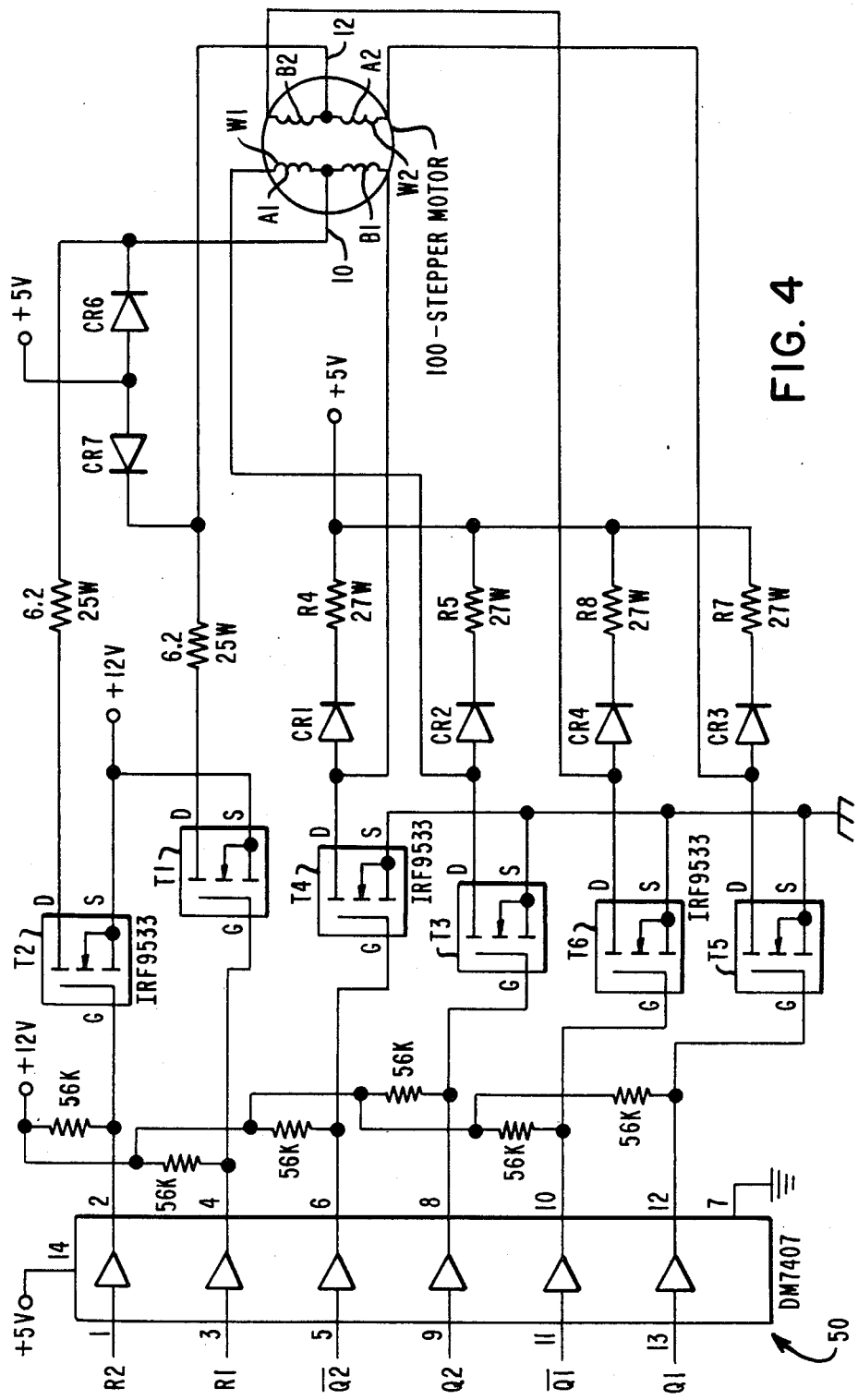
FIG. 4 illustrates in block schematic form the second and remaining portion of the preferred embodiment which includes the driver circuitry for the stepping motor.

Referring now to FIG. 4, a hex buffer 50 receives on its inputs the signals R2, R1, Q2/, Q2, Q1/ and Q1 from the output lines appearing in FIGS. 3B and 3C. The outputs from each of the buffer amplifiers in the hex buffer are connected by 56K pull-up resistors to a +12 V source. Each of the outputs is also directed to a gate input, labeled G, of a MOS device (gate) T2, T1, T4, T3, T6, and T5, respectively. A stepper motor 100, having two pairs of center tapped windings, W1 and W2, is provided with a first voltage level equal to +5 V through the diodes CR6 and CR7 that are connected to the center taps 10 and 12, respectively. The center taps lines are further connected by means of 6.2 ohm, 25 watt resistors and the transistor gates T2 and T1 (when enabled) to a 12 +V source. Each of the windings, at their outermost end away from the center tap, is connected to ground by means of their associated gate transistors T4, T3, T6 and T5. Each of the transistor gates has a diode CR1, CR2, CR4 and CR3, respectively and a 27 ohm resistor connecting their drain terminals to a +5 V source. This latter combination functions to eliminate spiking voltages from being applied to the drain inputs of the respective gate transistors.

In operation, when gate transistor T4 is ON, a current will flow through the stepping motor via the diode CR6 through the coil winding B1 to ground. When T4 is ON, T3 is OFF and in a like manner when T6 is ON T5 is OFF and in the stepping operation of the motor, these gate transistors toggle in pairs, in a complementary fashion, according to the state table of FIG. 2 to drive the stepping motor's rotor towards a null position. As previously indicated, a fixed time after the transition of the turn-on and turn-off of a gate transistor pair, the gate transistor, either T2 or T1, associated with that pair is turned OFF to remove the 12 +V from the pair that has just switched and the +12 V is not reapplied until the rotor position approaches its designated null at which time the +12 V is applied to firmly drive the rotor to the null position. When at rest, the +12 V remains applied to center taps 10 and 12.

While there has been shown what has been considered to be the preferred embodiment of the invention, it will be manifest that many changes and modifications may be made therein without departing from the essential spirit and scope of the invention. It is intended, therefore, in the annexed claims, to cover all such changes and modifications which may fall within the true scope of the invention.

I claim:

1. A control system for a single step stepping motor comprising:
    a stepping motor, having a first and a second pair of windings;
    means for selectively applying a first voltage level to a selected winding of said first and said second pair of windings to cause said motor to step towards a null position; and
    means for applying a second voltage of higher level than said first voltage to the selected winding prior to the motor reaching the null position.

2. The control system according to claim 1 wherein said means for applying includes timer means for causing said second voltage to be applied 2.5 milliseconds after the application of said first voltage.

3. The control system according to claim 2 wherein the windings of one of said pairs of said first and said second pair of windings are alternately energized to cause said motor to step towards a null position.

4. A control system for a stepping motor having a first and a second pair of separate phase windings comprising:
    a first source of power;
    complementary gating circuits, each connected to a respective pair of phase windings for alternately energizing the windings of a pair of separate phase windings with said first source of power so as to cause said motor to advance;
    a second source of power having a voltage greater than said first source; and
    gating means responsive to a time signal for applying said second source of power to said energized phase windings prior to said motor reaching its null position to dampen oscillations.

5. The control system according to claim 4 and further comprising:
    timing means responsive to said complementary gating circuits for providing said time signal to said gating means a preselected time after said phase windings are alternately energized to cause said gating means to apply said second source of power to said energized phase windings.

6. The control system according to claim 5 wherein said timing means provides said time signal 2.5 milliseconds after said phase windings are alternately energized.

7. The control system according to claim 6 where said timing means is a one shot multivibrator.

8. A control system for a stepping motor having a first pair and a second pair of separate phase windings, comprising:
    a first voltage source;
    a first diode coupling said first voltage source to the first pair of separate phase windings;
    a second diode coupling said first voltage source to the second pair of separate phase windings;
    four switch means, one each connected in series with each of said separate phase windings for controlling the current flow through its associated phase windings;
    a pair of toggling complementary means for applying toggling complementary signals to a pair of switch means connected to an associated pair of phase windings such that when one windings of a pair is energized by a current flow the other winding of the pair is not energized;

means for toggling one of said toggling complementary means to cause said stepping motor to move towards a null position;

a second voltage source;

a pair of gating means, one each connecting said second voltage source in series with said first pair and said second pair of separate phase windings; and timing means responsive to the toggle of a complementary means for applying a disabling signal to the gating means connected to the pair of separate phase windings that have been toggled so as to disconnect said second voltage source for a period of time ending prior to said stepping motor reaching the null position, so that said second voltage source is connected by the gating means immediately prior to and during the null position in order to dampen oscillations.

9. The control system according to claim 8 wherein said timing means is a pair of one-shot flip-flops which provide said disabling signal for a period of 2.5 milliseconds after said phase windings are toggled.

10. A control system for a stepping motor having a first pair and a second pair of separate phase windings comprising:

a first voltage source;

a first diode coupling said first voltage source to the first pair of separate phase windings;

a second diode coupling said first voltage source to the second pair of separate phase windings;

four switch means, one each connected in series with each of said separate phase windings for controlling the current flow through its associated phase winding;

a pair of toggling complementary means each applying complementary signals to a pair of switch means connected to an associated pair of phase windings such that when one winding of a pair is energized by a current flow the other winding of the pair is not energized;

a pair of 2-to-4 decoder means each coupled to an associated one of said pair of complementary means for receiving, as inputs, one output signal from each of said complementary means, and an enable signal, each pulse of the enable signal corresponding to one step of the stepping motor, each of said decoder means providing outputs of one logic level when not enabled and providing decoded outputs corresponding to the logic states of the one output signal from each of said pair of complementary means;

a pair of AND gates each receiving as inputs two non duplicating outputs from each of said pair of 2-to-4 decoder means, each AND gate providing a pulse signal when its respective inputs are all logic level high;

timing means for receiving said pulse signal and for providing a gating signal a fixed time after the receipt of said pulse signal; and a second voltage source; and gating means responsive to said gating signal from said timing means for connecting said second voltage source to the pair of separate phase windings last toggled by said toggling complementary means.

* * * * *